United States Patent
Sun et al.

(10) Patent No.: US 12,040,000 B2
(45) Date of Patent: Jul. 16, 2024

(54) SPECIAL EFFECT PROCESSING METHOD AND APPARATUS

(71) Applicant: Lemon Inc., Grand Cayman (KY)

(72) Inventors: Chenyu Sun, Los Angeles, CA (US); Jitong Chen, Los Angeles, CA (US); Nathanael Schager, Los Angeles, CA (US); Maryyann Crichton, Culver City, CA (US); Josiah John Serrano, Culver City, CA (US); Bochen Li, Los Angeles, CA (US); Xuefan Hu, Los Angeles, CA (US); Fraser Smith, London (GB); Hwankyoo Shawn Kim, Culver City, CA (US); David Trevelyan, London (GB); Suiyu Feng, Beijing (CN); Brandon Wu, Los Angeles, CA (US); Tao Xiong, Beijing (CN)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/366,478

(22) Filed: Aug. 7, 2023

(65) Prior Publication Data

US 2023/0377608 A1 Nov. 23, 2023

Related U.S. Application Data

(63) Continuation of application No. PCT/SG2022/050049, filed on Jan. 31, 2022.

(30) Foreign Application Priority Data

Feb. 7, 2021 (CN) .......................... 202110179875.2

(51) Int. Cl.
*G11B 27/031* (2006.01)
*G06F 3/04847* (2022.01)
(Continued)

(52) U.S. Cl.
CPC ........ *G11B 27/031* (2013.01); *G06F 3/04847* (2013.01); *G06F 3/0488* (2013.01); *G11B 27/007* (2013.01); *G06F 3/165* (2013.01)

(58) Field of Classification Search
CPC . G11B 27/031; G11B 27/007; G06F 3/04847; G06F 3/04888
See application file for complete search history.

(56) References Cited

U.S. PATENT DOCUMENTS

| | | |
|---|---|---|
| 2008/0026690 A1 | 1/2008 | Foxenland |
| 2009/0015653 A1 | 1/2009 | Baek |

(Continued)

FOREIGN PATENT DOCUMENTS

| | | |
|---|---|---|
| CN | 104103300 A | 10/2014 |
| CN | 105530440 A | 4/2016 |

(Continued)

OTHER PUBLICATIONS

China National Intellectual Property Administration, Office Action and Search Report Issued in Application No. 202110179875.2, dated Oct. 19, 2022, 8 pages. Submitted with partial English translation.

(Continued)

*Primary Examiner* — Mishawn N. Hunter
(74) *Attorney, Agent, or Firm* — Alleman Hall & Tuttle LLP (57) ABSTRACT

The present application provides a special effect processing method and apparatus. The method includes: generating an audio signal in response to a touch operation of a user in a process of playing a video; segmenting the audio signal into multiple audio frames; performing, according to attributes of the audio frames, special effect processing on a picture which is currently played in the video.

20 Claims, 7 Drawing Sheets

(51) Int. Cl.
*G06F 3/0488* (2022.01)
*G11B 27/00* (2006.01)
*G06F 3/16* (2006.01)

(56) References Cited

U.S. PATENT DOCUMENTS

2020/0356780 A1 11/2020 Song et al.
2021/0289070 A1* 9/2021 Thomson .......... H04M 3/42391

FOREIGN PATENT DOCUMENTS

| CN | 106328164 A | 1/2017 |
|---|---|---|
| CN | 107592486 A | 1/2018 |
| CN | 108259925 A | 7/2018 |
| CN | 108989706 A | 12/2018 |
| CN | 109495767 A | 3/2019 |
| CN | 109756628 A | 5/2019 |
| CN | 110069641 A | 7/2019 |
| CN | 110634465 A | 12/2019 |
| CN | 111223470 A | 6/2020 |
| CN | 112259062 A | 1/2021 |
| EP | 3154051 A1 | 4/2017 |
| GB | 2593059 A | 9/2021 |
| WO | 2020077914 A1 | 4/2020 |

OTHER PUBLICATIONS

China National Intellectual Property Administration, International Search Report Issued in Application No. PCT/SG2022/050049, dated Feb. 3, 2022 WIPO, 16 pages.

European Patent Office, Partial European Search Report Issued in Application No. 22750130.1, May 28, 2024, 11 pages.

* cited by examiner

FIG. 1

```
Generating an audio signal in response to touch operations of a user on
the first music control 301 and the second music control 302 in       — S201
          a process of playing a video
                           ↓
     Segmenting the audio signal into multiple audio frames            — S202
                           ↓
Performing, according to attributes of the audio frames, special effect — S203
 processing on a picture which is currently played in the video
```

```
┌─────────────────────────────────────────────────────────┐
│ Generating an audio signal in response to touch         │
│ operations of a user on the first music control 301,    │─ S701
│ the second music control 302 and the third music        │
│ control 1001 in a process of playing a video            │
└─────────────────────────────────────────────────────────┘
                          ↓
┌─────────────────────────────────────────────────────────┐
│ Segmenting the audio signal into multiple audio frames  │─ S702
└─────────────────────────────────────────────────────────┘
                          ↓
┌─────────────────────────────────────────────────────────┐
│ Performing, according to attributes of the audio        │─ S703
│ frames, special effect processing on a picture which    │
│ is currently played in the video                        │
└─────────────────────────────────────────────────────────┘
```

```
Generating an audio signal in response to touch operations on the first
music control 301, the second music control 302 and the speed slider
1201 in a process of playing a video                                    — S901

Segmenting the audio signal into multiple audio frames    — S902

Performing, according to attributes of the audio frames, special effect
processing on a picture which is currently played in the video    — S903
```

SPECIAL EFFECT PROCESSING METHOD AND APPARATUS

CROSS-REFERENCE TO RELATED APPLICATION

The present application is a continuation of International Application No. PCT/SG2022/050049, filed on Jan. 31, 2022, which claims priority to Chinese Patent Application No. 202110179875.2, filed to China National Intellectual Property Administration on Feb. 7, 2021 and entitled "Special Effect Processing Method and Apparatus". The contents of the above applications are incorporated by reference in their entireties.

TECHNICAL FIELD

The present application relates to the field of terminal technology and, in particular, to a special effect processing method and an apparatus.

BACKGROUND

With the development of terminal technology, functions provided by a terminal device are more and more abundant. In recent years, small video applications are favored by users. A small video application not only can be used to browse small videos posted by network bloggers, but also can be used to make and post small videos by the users themselves, which improves the users' sense of participation.

In the process of making a small video, a user can use many props to achieve desired special effects. However, at present, many props are related to image display, and the special effects have a single function, which leads to incomprehensive user experience.

SUMMARY

The present application provides a special effect processing method and an apparatus, which can provide a special effect related to music creation with abundant functions, thus improving user experience.

In a first aspect, the present application provides a special effect processing method, including: generating an audio signal in response to a touch operation of a user in a process of playing a video; segmenting the audio signal into multiple audio frames; performing, according to attributes of the audio frames, special effect processing on a picture which is currently played in the video.

In an implementation, the attributes include frequency spectrums; and performing, according to the attributes of the audio frames, the special effect processing on the picture which is currently played in the video includes: controlling, according to a first energy value corresponding to a first preset interval on a frequency spectrum, whether to add animation to an operation control corresponding to the touch operation.

In an implementation, controlling, according to the first energy value corresponding to the first preset interval on the frequency spectrum, whether to add the animation to the operation control corresponding to the touch operation includes: if the first energy value is greater than or equal to a preset energy value, adding the animation to the operation control corresponding to the touch operation.

In an implementation, the attributes include frequency spectrums; and performing, according to the attributes of the audio frames, the special effect processing on the picture which is currently played in the video includes: controlling, according to a second energy value corresponding to a second preset interval on a frequency spectrum, a full-screen floodlight effect by using a filter.

In an implementation, controlling, according to the second energy value corresponding to the second preset interval on the frequency spectrum, the full-screen floodlight effect by using the filter includes: determining, according to the second energy value and a preset mapping relationship, brightness corresponding to the second energy value, where the preset mapping relationship is a preset correspondence between energy values and brightness; adjusting a brightness intensity parameter of the filter to the brightness corresponding to the second energy value.

In an implementation, the first preset interval includes a preset number of first frequencies from the lowest frequency to the highest frequency on the frequency spectrum, and the first energy value is a sum of energy values corresponding to the preset number of first frequencies.

In an implementation, the second preset interval includes a preset number of last frequencies from the lowest frequency to the highest frequency on the frequency spectrum, and the second energy value is a sum of energy values corresponding to the preset number of last frequencies.

In an implementation, the operation control corresponding to the touch operation includes: a first music control and a second music control, where the first music control corresponds to a low-frequency timbre, and the second music control corresponds to a high-frequency timbre; generating the audio signal includes: performing looping rendering on notes corresponding to the first music control according to the timbre corresponding to the first music control to obtain an audio signal corresponding to the first music control; performing looping rendering on notes corresponding to the second music control according to the timbre corresponding to the second music control to obtain an audio signal corresponding to the second music control; superimposing the audio signal corresponding to the first music control and the audio signal corresponding to the second music control to obtain the audio signal.

In an implementation, the operation control corresponding to the touch operation includes: a first music control, a second music control and a third music control, where the first music control corresponds to a low-frequency timbre, the second music control corresponds to a high-frequency timbre, and the third music control corresponds to a first audio signal; generating the audio signal includes: performing looping rendering on notes corresponding to the first music control according to the timbre corresponding to the first music control to obtain an audio signal corresponding to the first music control; performing looping rendering on notes corresponding to the second music control according to the timbre corresponding to the second music control to obtain an audio signal corresponding to the second music control; superimposing the audio signal corresponding to the first music control, the audio signal corresponding to the second music control and the first audio signal to obtain the audio signal, where the first audio signal is an audio signal rendered in advance.

In an implementation, the operation control corresponding to the touch operation includes: a first music control, a second music control and a speed slider, where the first music control corresponds to a low-frequency timbre, and the second music control corresponds to a high-frequency timbre; generating the audio signal includes: performing looping rendering on notes corresponding to the first music control according to the timbre corresponding to the first music control and the number of beats per minute corresponding to the speed slider to obtain the audio signal corresponding to the first music control; performing looping rendering on notes corresponding to the second music control according to the timbre corresponding to the second music control and the number of beats per minute corresponding to the speed slider to obtain the audio signal corresponding to the second music control; superimposing the audio signal corresponding to the first music control and the audio signal corresponding to the second music control to obtain the audio signal.

In a second aspect, the present application provides a terminal device, including: an audio signal generating module, configured to generate an audio signal in response to a touch operation of a user in a process of playing a video; a processing module, configured to segment the audio signal into multiple audio frames, and perform, according to attributes of the audio frames, special effect processing on a picture which is currently played in the video.

In a third aspect, the present application provides a computer-readable storage medium having a computer program stored thereon, where the method provided in the first aspect is implemented when the computer program is executed by a processor.

In a fourth aspect, the present application provides a terminal device, including: a processor; and a memory, configured to store executable instructions of the processor; where the processor is configured to implement the method provided in the first aspect by executing the executable instructions.

In a fifth aspect, the present application provides a program product including a computer program, where the program product is stored in a readable storage medium, and the method provided in the first aspect is implemented when the computer program is executed by a processor.

In a sixth aspect, the present application provides a computer program, where the program product is stored in a readable storage medium, and the method provided in the first aspect is implemented when the computer program is executed by a processor.

Using the special effect processing method and apparatus provided by the present application, the user can perform the touch operation in a user interface in the process of playing the video, and the terminal device can generate the corresponding audio signal in response to the touch operation of the user, segment the audio signal into multiple audio frames, and perform the special effect processing on the picture in the video based on the attributes of the audio frames. Through the method provided by the present application, the user can create music in the process of playing the video, and the picture in the video will change with the music created by the user, which stimulates participation of a potential user who is interested in music creation and improves user experience.

DESCRIPTION OF EMBODIMENTS

In order to make objects, technical solutions and advantages of the present application clearer, the technical solutions in the present application will be clearly and comprehensively described in connection with the drawings in the present application, and obviously, the described embodiments are part of embodiments of the present application, rather than all embodiments. Based on the embodiments in the present application, all other embodiments obtained by one of ordinary skill in the art without paying creative efforts belong to the protection scope of the present application.

In the present application, it should be explained that the terms "first" and "second" are only used for descriptive purposes, and cannot be understood as indicating or implying relative importance. In addition, "at least one" means one or more, and "multiple" means two or more. "And/or", which describes the association relationship of the associated objects, means that there can be three kinds of relationships. For example, "A and/or B" can mean that A exists alone, A and B exist at the same time, and B exists alone, where A and B can be singular or plural. The character "/" generally means that the associated objects before and after the character are in a relationship of "or". "At least one of the following items" or its similar expression refers to any combination of these items, including a single item or any combination of plural items. For example, "at least one of a, b, or c" can indicate that: single a, single b, single c, a combination of a and b, a combination of a and c, a combination of b and c, or a combination of a, b and c, where a, b and c can be single or multiple.

Figure 1:
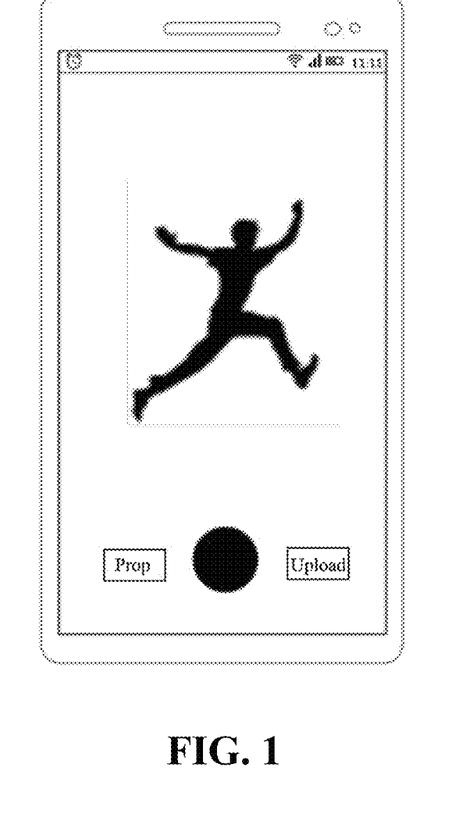
FIG. 1 is a diagram of an application scenario provided by the present application.

Exemplary, FIG. 1 shows a diagram of an application scenario of the present application. In a current small video platform, when a user wants to add a special effect in a process of playing a video, the user can click a prop button and choose a favorite prop from various props provided by the small video platform, and a picture in the video will display the corresponding special effect. However, the props provided by the small video platform are all related to image display. The user cannot create music for the video, and the picture in the video will not change with the music created by the user. For a potential user who is interested in music creation, the current small video platform has a single function and the experience is not good enough.

Therefore, the present application provides a special effect processing method. A user can click a music control in a user interface in a process of playing a video, and when the user clicks the music control, a corresponding audio signal can be generated and corresponding animation is added to a picture of the video based on the audio signal, so that the picture in the video will change with the audio signal, which stimulates participation of a potential user who is interested in music creation and improves user experience.

The special effect processing method provided by the present application can be executed by a terminal device. The form of the terminal device includes but is not limited to: a smart phone, a tablet personal computer, a laptop or a television, etc. The present application does not limit the form of the terminal device.

The technical solutions of the present application and how the technical solutions of the present application solve the above technical problems will be described in detail in the following specific embodiments. The following several specific embodiments can be combined with each other, and same or similar concepts or processes may not be repeated in some embodiments. In the following, the embodiments of the present application will be described in combination with the drawings.

Figure 2:
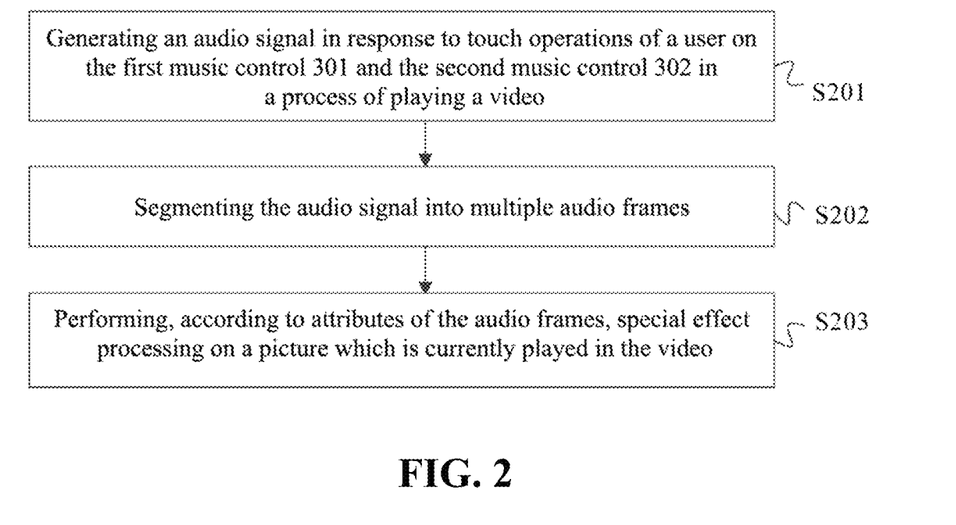
FIG. 2 is a schematic flowchart of Embodiment 1 of a special effect processing method provided by the present application.
Figure 3:
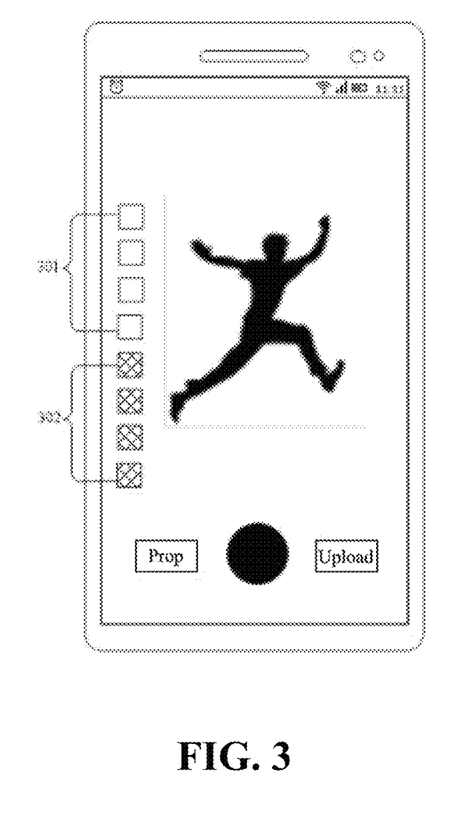
FIG. 3 is a diagram of a user interface corresponding to Embodiment 1 provided by the present application.

FIG. 2 is a schematic flowchart of Embodiment 1 of a special effect processing method provided by the present application. FIG. 3 is a diagram of a user interface corresponding to Embodiment 1. As shown in FIG. 3, operation controls on the user interface can include: a first music control 301 and a second music control 302. A difference between the first music control 301 and the second music control 302 lies in that the first music control 301 corresponds to a low-frequency timbre and the second music control 302 corresponds to a high-frequency timbre. For example, the first music control 301 may correspond to a timbre of a low-frequency instrument such as a drum and a bass, and the second music control 302 may correspond to a timbre of a composite sound, a string substrate and/or a high-frequency instrument.

In an implementation, since there are many kinds of drums and basses, different kinds of drums and basses have different timbres. In order to allow a user to use drums and basses with different timbres to perform music creation, as shown in FIG. 3, four first music controls 301 can be set on the user interface, and the four first music controls 301 have different timbres. Similarly, four second music controls 302 can be set on the user interface, and the timbres of the four second music controls 302 are also different. In FIG. 3, each of the first music controls 301 and each of the second music controls 302 have a corresponding segment of notes.

As shown in FIG. 2, the special effect processing method provided by this embodiment includes the following steps.

S201, generating an audio signal in response to touch operations of a user on the first music control 301 and the second music control 302 in a process of playing a video.

It should be explained that the process of playing the video in this embodiment may be a preview process before the user clicks to record when making a small video, and may also be a recording process after the user clicks to record, which is not limited in this embodiment. In addition, the touch operations of the user on the first music control 301 and the second music control 302 may be single-click operations or double-click operations or the like, and the form of the touch operations is not limited in this embodiment.

Figure 4:
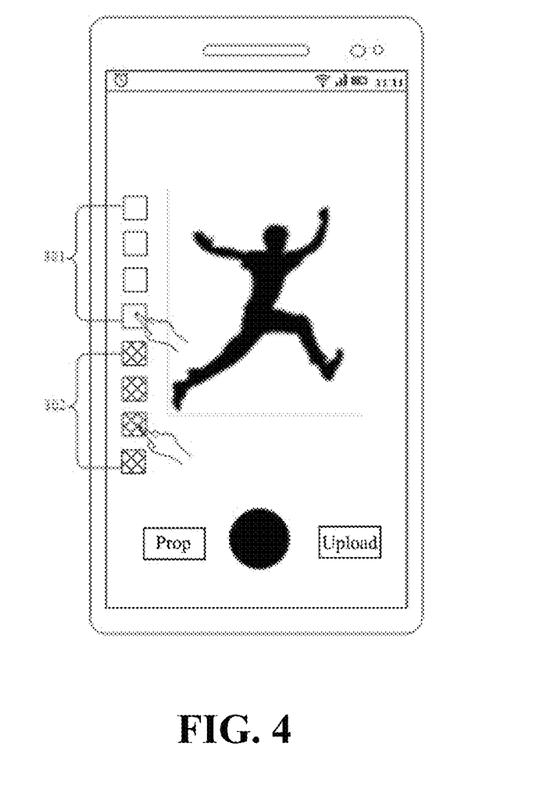
FIG. 4 is a schematic diagram of a touch operation provided by the present application.

As shown in FIG. 4, the user can trigger the first music control 301 and the second music control 302 at the same time. When the user triggers the first music control 301 and the second music control 302 at the same time, on the one hand, a terminal device can perform looping rendering on notes corresponding to the first music control 301 according to the timbre corresponding to the first music control 301 to obtain an audio signal corresponding to the first music control 301; on the other hand, the terminal device can perform looping rendering on notes corresponding to the second music control 302 according to the timbre corresponding to the second music control 302 to obtain an audio signal corresponding to the second music control 302, and then superimpose the audio signal corresponding to the first music control 301 and the audio signal corresponding to the second music control 302 to obtain a superimposed audio signal. The specific rendering process can be found in the related art, and the details will not be repeated here in this embodiment.

S202, segmenting the audio signal into multiple audio frames.

Figure 5:
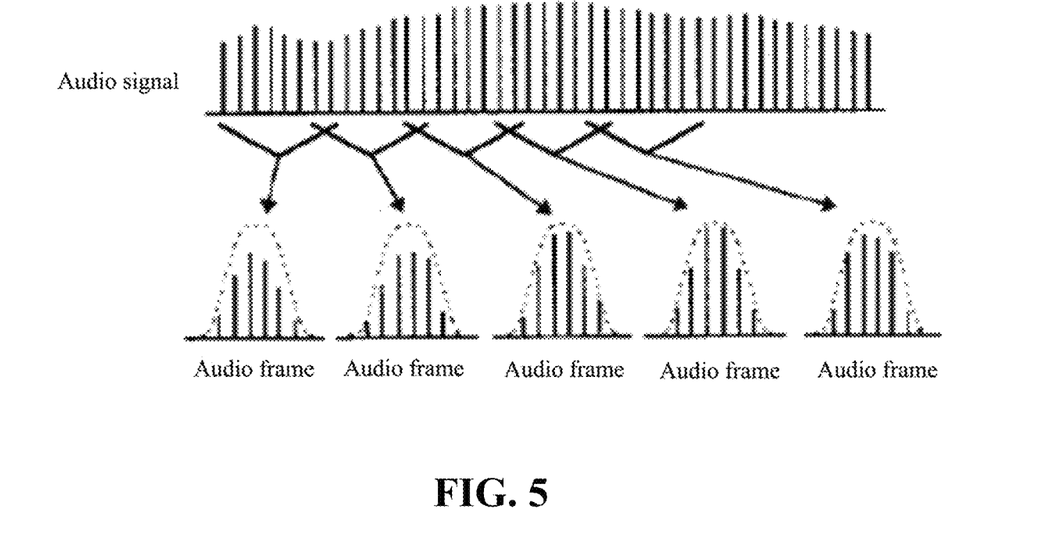
FIG. 5 is a schematic diagram of audio frame segmenting provided by the present application.

In an implementation, as shown in FIG. 5, the audio signal may be segmented in units of 20 ms, that is, each audio frame is 20 ms, and there is 50% overlap between two adjacent audio frames. For example, the 1st millisecond to the 20th millisecond (1 ms-20 ms) is the first audio frame, and the 10th millisecond to the 30th millisecond (10 ms-30 ms) may be the second audio frame.

S203, performing, according to attributes of the audio frames, special effect processing on a picture which is currently played in the video.

In an implementation, the attributes of the audio frames may be frequency spectrums, energy or volume. A process of acquiring the frequency spectrums of the audio frames is described as follows: performing Fourier transform on each audio frame to obtain a frequency spectrum of the audio frame after segmenting the audio signal into multiple audio frames.

The following is an example for illustration.

Figure 6:
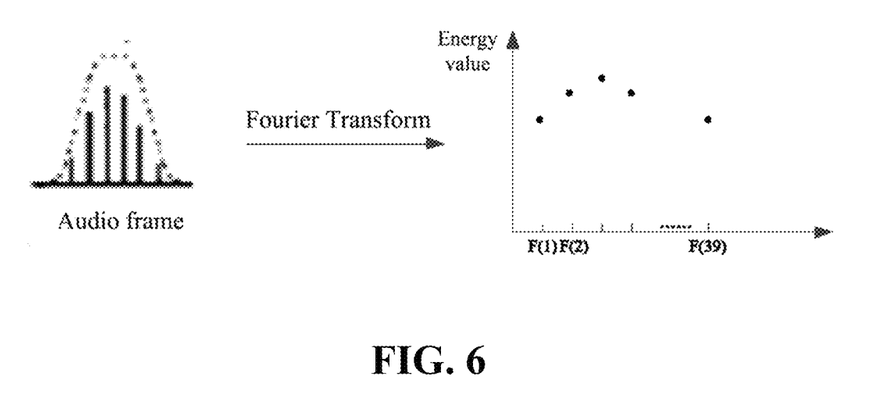
FIG. 6 is a principle diagram of frequency spectrum acquisition provided by the present application.

It is assumed that the number of frequency points configured by the user is 40. Taking any one audio frame in FIG. 5 as an example, after performing Fourier transform on the audio frame, as shown in FIG. 6, a 40-dimensional frequency spectrum can be obtained, and the 0th dimension is a direct current component and the 1st dimension to the 39th dimension are frequency components from low to high.

After obtaining the frequency spectrum of the audio frame, on the one hand, whether to add animation to an operation control corresponding to the touch operation can be controlled according to a first energy value corresponding to a first preset interval on the frequency spectrum; on the other hand, a full-screen floodlight effect can be controlled by using a filter according to a second energy value corresponding to a second preset interval on the frequency spectrum. The filter is configured to perform filtering processing on the picture.

In the following, an implementable way of controlling, according to the first energy value corresponding to the first preset interval on the frequency spectrum, whether to add the animation to the operation control corresponding to the touch operation is introduced: The first preset interval may include a preset number of first frequencies from the lowest frequency to the highest frequency on the frequency spectrum, and the first energy value is a sum of energy values corresponding to the preset number of first frequencies. For example, the preset number is 10. The first preset interval includes F(1) to F(10), i.e., first 10 frequencies from the lowest frequency to the highest frequency, and the first energy value is a sum of energy values corresponding to F(1) to F(10). It can be controlled whether to add animation to the operation control corresponding to the touch operation of the user according to the first energy value. Specifically, it can be judged whether the first energy value is greater than or equal to a preset energy value, and if yes, animation is added to the operation control corresponding to the touch operation of the user.

Here is an example for illustration.

It is assumed that the touch operation of the user is as shown in FIG. 4, the frequency spectrum of the current audio frame is as shown in FIG. 6, and the sum of energy values corresponding to F(1) to F(10) is B. It is judged whether B is greater than or equal to the preset energy value, and if yes, animation is added at two controls clicked by the user as shown in FIG. 4.

In the following, an implementable way of controlling the full-screen floodlight effect by using the filter according to the second energy value corresponding to the second preset interval on the frequency spectrum is introduced: The second preset interval may include a preset number of last frequencies from the lowest frequency to the highest frequency on the frequency spectrum, and the second energy value is a sum of energy values corresponding to the preset number of last frequencies. For example, the preset number is 10. The second preset interval includes F(30) to F(39), i.e., last 10 frequencies from the lowest frequency to the highest frequency, and the second energy value is a sum of energy values corresponding to F(30) to F(39). A brightness intensity parameter of the filter can be controlled according to the second energy value. Specifically, brightness corresponding to the second energy value can be determined according to the second energy value and a preset mapping relationship, and the brightness intensity parameter of the filter is adjusted to the brightness corresponding to the second energy value. The above preset mapping relationship is a preset correspondence between energy values and brightness.

Here is an example for illustration.

It is assumed that the touch operation of the user is as shown in FIG. 4, the frequency spectrum of the current audio frame is as shown in FIG. 6, and the sum of energy values corresponding to F(30) to F(39) is C. Brightness corresponding to C is searched for from the preset mapping relationship, and if the brightness corresponding to C is X, the brightness intensity parameter of the filter is adjusted to X.

In the above, the special effect processing process provided by this embodiment is illustrated only by taking one audio frame as an example, and it should be noted that S203 can be executed for each audio frame since the audio signal is continuous.

It should be noted that the above first preset interval includes the preset number of first frequencies from the lowest frequency to the highest frequency on the frequency spectrum, and the second preset interval includes the preset number of last frequencies from the lowest frequency to the highest frequency on the frequency spectrum, which is only an example and does not constitute a limitation on the first preset interval and the second preset interval. The first preset interval and the second preset interval may be any interval on the frequency spectrum and can be selected flexibly according to an actual situation.

Using the special effect processing method provided by the present application, the user can perform the touch operation in the user interface in the process of playing the video, and the terminal device can generate the corresponding audio signal in response to the touch operation of the user, segment the audio signal into multiple audio frames, and perform the special effect processing on the picture in the video based on the attributes of the audio frames. Through the method provided by the present application, the user can create music in the process of playing the video, and the picture in the video will change with the music created by the user, which stimulates participation of a potential user who is interested in music creation and improves user experience.

Figure 7:
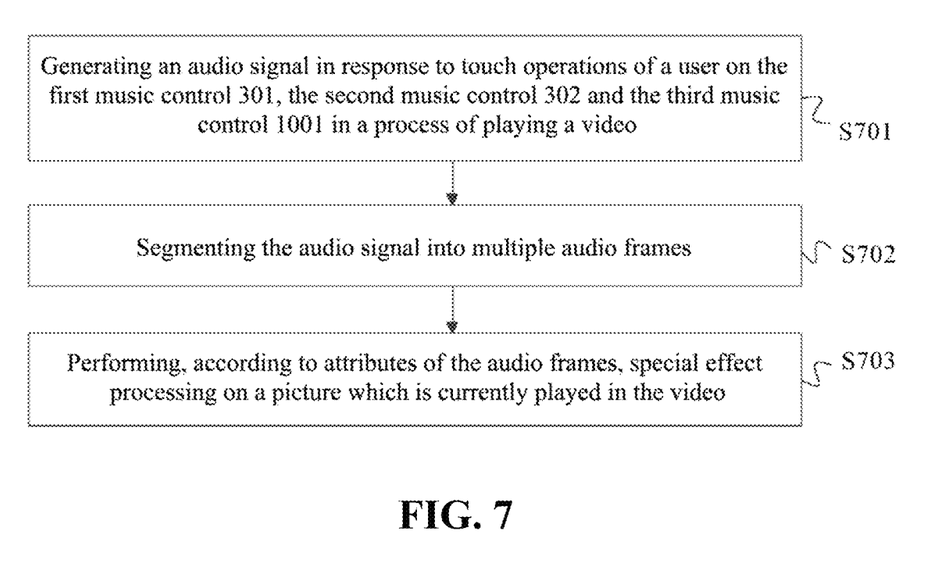
FIG. 7 is a schematic flowchart of Embodiment 2 of a special effect processing method provided by the present application.
Figure 8:
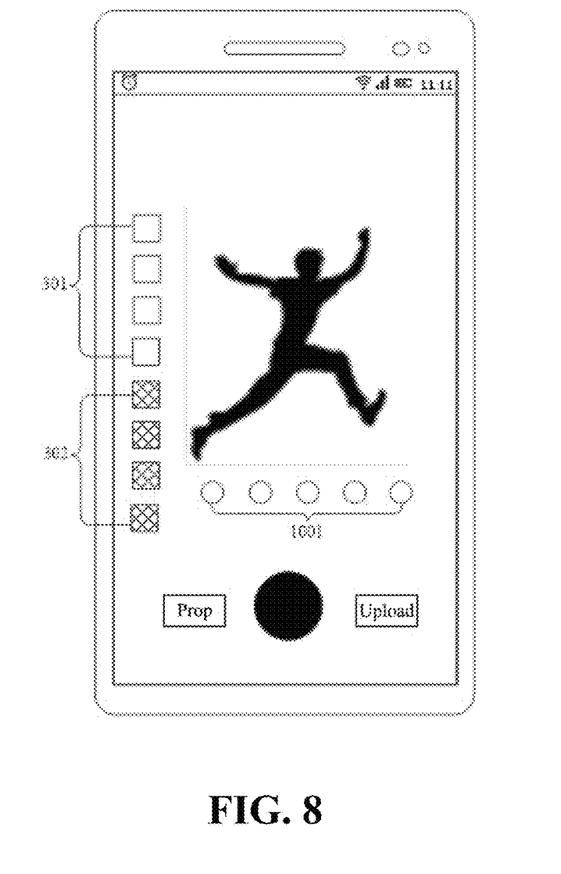
FIG. 8 is a diagram of a user interface corresponding to Embodiment 2 provided by the present application.

FIG. 7 is a schematic flowchart of Embodiment 2 of a special effect processing method provided by the present application. In this embodiment, in order to allow a user to create more layered music, operation controls shown in FIG. 8 can be provided on a user interface. The operation controls shown in FIG. 8 include: a first music control 301, a second music control 302 and a third music control 1001. Same as the above embodiment, a difference between the first music control 301 and the second music control 302 lies in that the first music control 301 corresponds to a low-frequency timbre and the second music control 302 corresponds to a high-frequency timbre. Detailed settings of the first music control 301 and the second music control 302 can be found in the above embodiment, and will not be repeated in this embodiment. The third music control 1001 corresponds to a first audio signal rendered in advance. As shown in FIG. 8, five third music controls 1001 can be set on the user interface, and the five third music controls 1001 correspond to five different audio signals rendered in advance, respectively. For example, one of the third music controls 1001 may correspond to a "dripping" audio signal rendered in advance.

As shown in FIG. 7, the special effect processing method provided by this embodiment includes the following steps.

S701, generating an audio signal in response to touch operations of a user on the first music control 301, the second music control 302 and the third music control 1001 in a process of playing a video.

In this embodiment, the touch operations of the user on the first music control 301, the second music control 302 and the third music control 1001 may be single-click operations or double-click operations or the like, and the form of the touch operation is not limited in this embodiment.

After the user performs the touch operations on the first music control 301, the second music control 302 and the third music control 1001, on the one hand, a terminal device can perform looping rendering on notes corresponding to the first music control 301 according to the timbre corresponding to the first music control 301 to obtain an audio signal corresponding to the first music control 301. On the other hand, looping rendering can be performed on notes corresponding to the second music control 302 according to the timbre corresponding to the second music control 302 to obtain an audio signal corresponding to the second music control 302. The audio signal corresponding to the first music control 301, the audio signal corresponding to the second music control 302 and the first audio signal are superimposed to obtain a superimposed audio signal.

It should be noted that because the looping rendering is performed on the notes corresponding to the first music control 301 and the notes corresponding to the second music control 302, respectively, the notes corresponding to the first music control 301 and the notes corresponding to the second music control 302 in the superimposed audio signal in S702 are played on a loop; and that because the first audio signal corresponding to the third music control is rendered in advance and is not a result of looping rendering of a certain segment of notes, the first audio signal in the superimposed audio signal in S702 is played only once. For example, the first third music control from left to right in FIG. 8 corresponds to a "dripping" audio signal rendered in advance, so a "dripping" sound is played only once after the user triggers the first third music control.

S702, segmenting the audio signal into multiple audio frames.

S703, performing, according to attributes of the audio frames, special effect processing on a picture which is currently played in the video.

For an implementing process of S702-S703, please refer to S202-S203 in the above embodiment, which will not be repeated here in this embodiment.

In the special effect processing method provided by the present application, the third music control is added, so that the music created by the user is more layered, and user experience is further improved.

Figure 9:
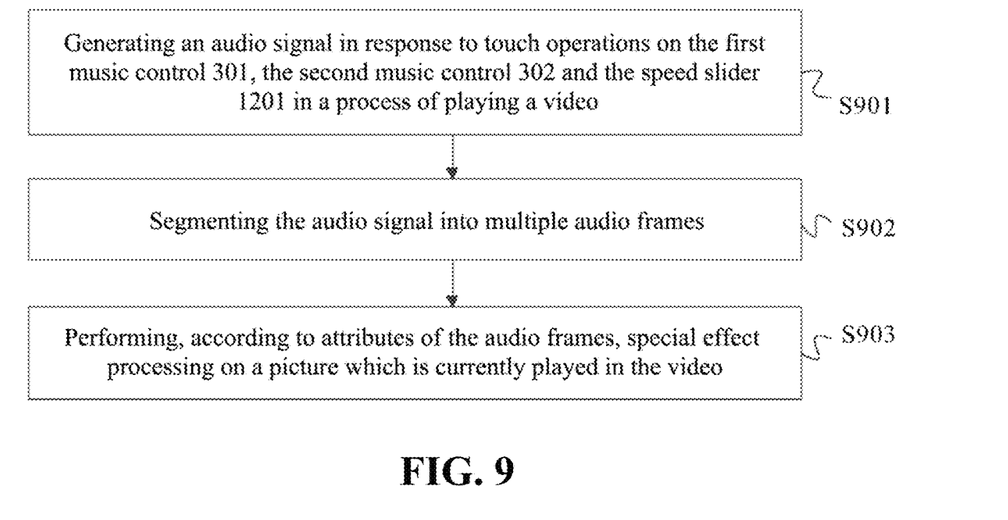
FIG. 9 is a schematic flowchart of Embodiment 3 of a special effect processing method provided by the present application.

FIG. 9 is a schematic flowchart of Embodiment 3 of a special effect processing method provided by the present application. In this embodiment, in order to enable a user to change a rhythm of music, operation controls shown in FIG. 10 can be provided on a user interface. The operation controls shown in FIG. 10 include: a first music control 301, a second music control 302 and a speed slider 1002. Same as the above embodiments, a difference between the first music control 301 and the second music control 302 lies in that the first music control 301 corresponds to a low-frequency timbre and the second music control 302 corresponds to a high-frequency timbre. Detailed settings of the first music control 301 and the second music control 302 can be found in the above embodiments, and will not be repeated in this embodiment. The user can adjust a rhythm of an audio signal by adjusting the speed slider 1002.

As shown in FIG. 9, the special effect processing method provided by this embodiment includes the following steps.

S901, generating an audio signal in response to touch operations of a user on the first music control 301, the second music control 302 and the speed slider 1002 in a process of playing a video.

In this embodiment, the touch operations of the user on the first music control 301 and the second music control 302 may be single-click operations or double-click operations, and the touch operation of the user on the speed slider may be a sliding operation.

Figure 10:
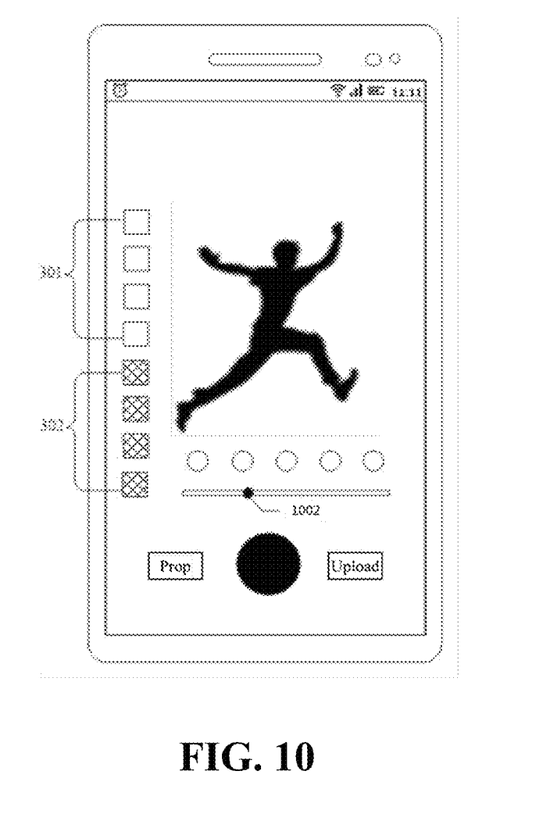
FIG. 10 is a diagram of a user interface corresponding to Embodiment 3 provided by the present application.

When the user performs the touch operations on the first music control 301 and the second music control 302 and slides the speed slider 1002 to a certain position, on the one hand, a terminal device performs looping rendering on notes corresponding to the first music control 301 according to the timbre corresponding to the first music control 301 and the number of beats per minute corresponding to the speed slider to obtain an audio signal corresponding to the first music control. On the other hand, looping rendering is performed on notes corresponding to the second music control 302 according to the timbre corresponding to the second music control 302 and the number of beats per minute corresponding to the speed slider to obtain an audio signal corresponding to the second music control 302. The audio signal corresponding to the first music control 301 and the audio signal corresponding to the second music control 302 are superimposed to obtain a superimposed audio signal.

The rhythm of the audio signal is related to the rendering speed, and the rendering speed is related to the number of beats per minute. In the above two embodiments, the terminal device can use the default number of beats per minute to perform the looping rendering on the notes corresponding to the first music control 301 and the second music control 302, respectively. In this embodiment, the speed slider can be associated with the number of beats per minute, so that the user can change the number of beats per minute by adjusting the speed slider, thereby changing the rendering speed and thus changing the rhythm of the audio signal.

S902, segmenting the audio signal into multiple audio frames.

S903, performing, according to attributes of the audio frames, special effect processing on a picture which is currently played in the video.

For an implementing process of S902-S903, please refer to S202-S203 in the above embodiment, which will not be repeated here in this embodiment.

In the special effect processing method provided by the present application, the speed slider is added, so that the user can change the rhythm of the audio signal, and user experience is further improved.

Figure 11:
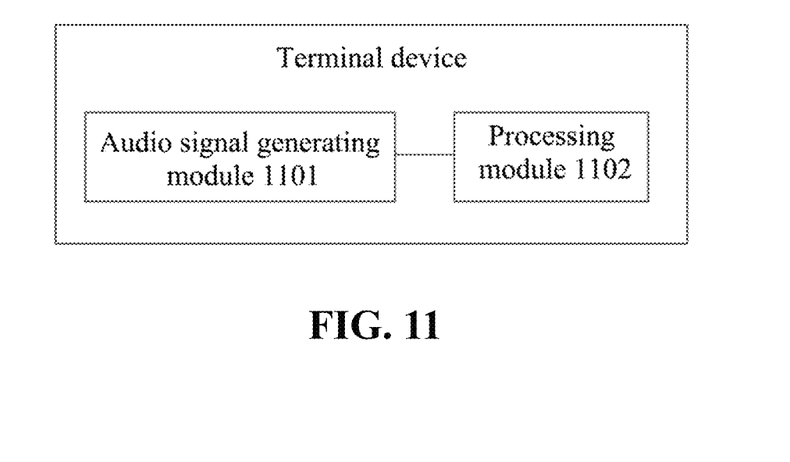
FIG. 11 is a schematic structural diagram of a terminal device provided by the present application.

FIG. 11 is a schematic structural diagram of a terminal device provided by the present application. As shown in FIG. 11, the terminal device by the present application includes:

an audio signal generating module 1101, configured to generate an audio signal in response to a touch operation of a user in a process of playing a video;

a processing module 1102, configured to: segment the audio signal into multiple audio frames; perform, according to attributes of the audio frames, special effect processing on a picture which is currently played in the video.

In an implementation, the attributes includes frequency spectrums; the processing module 1102 is specifically configured to:

control, according to a first energy value corresponding to a first preset interval on a frequency spectrum, whether to add animation to an operation control corresponding to the touch operation.

In an implementation, the processing module 1102 is specifically configured to: if the first energy value is greater than or equal to a preset energy value, add the animation to the operation control corresponding to the touch operation.

In an implementation, the processing module 1102 is specifically configured to:

control a full-screen floodlight effects by using a filter according to a second energy value corresponding to a second preset interval on a frequency spectrum, where the filter is configured to perform filtering processing on the picture.

In an implementation, the processing module 1102 is specifically configured to:

determine, according to the second energy value and a preset mapping relationship, brightness corresponding to the second energy value, where the preset mapping relationship is a preset corresponding relationship between energy values and brightness;

adjust a brightness intensity parameter of the filter to the brightness corresponding to the second energy value.

In an implementation, the first preset interval includes a preset number of first frequencies from the lowest frequency to the highest frequency on the frequency spectrum, and the first energy value is a sum of energy values corresponding to the preset number of first frequencies.

In an implementation, where the second preset interval includes a preset number of last frequencies from the lowest frequency to the highest frequency on the frequency spectrum, and the second energy value is a sum of energy values corresponding to the preset number of last frequencies.

In an implementation, the operation control corresponding to the touch operation includes: a first music control and a second music control, where the first music control corresponds to a low-frequency timbre, and the second music control corresponds to a high-frequency timbre; the audio signal generating module 1101 is specifically configured to:

perform looping rendering on notes corresponding to the first music control according to the timbre corresponding to the first music control to obtain an audio signal corresponding to the first music control;

perform looping rendering on notes corresponding to the second music control according to the timbre corresponding to the second music control to obtain an audio signal corresponding to the second music control;

superimpose the audio signal corresponding to the first music control and the audio signal corresponding to the second music control to obtain the audio signal.

In an implementation, the operation control corresponding to the touch operation includes: a first music control, a second music control and a third music control, where the first music control corresponds to a low-frequency timbre, the second music control corresponds to a high-frequency timbre, and the third music control corresponds to a first audio signal; the audio signal generating module 1101 is specifically configured to:

perform looping rendering on notes corresponding to the first music control according to the timbre corresponding to the first music control to obtain an audio signal corresponding to the first music control;

performing looping rendering on notes corresponding to the second music control according to the timbre corresponding to the second music control to obtain an audio signal corresponding to the second music control;

superimpose the audio signal corresponding to the first music control, the audio signal corresponding to the second music control and the first audio signal to obtain the audio signal, where the first audio signal is an audio signal rendered in advance.

In an implementation, the operation control corresponding to the touch operation includes: a first music control, a second music control and a speed slider, where the first music control corresponds to a low-frequency timbre and the second music control corresponds to a high-frequency timbre; the audio signal generating module 1101 is specifically configured to:

perform looping rendering on notes corresponding to the first music control according to the timbre corresponding to the first music control and the number of beats per minute corresponding to the speed slider to obtain an audio signal corresponding to the first music control;

perform looping rendering on notes corresponding to the second music control according to the timbre corresponding to the second music control and the number of beats per minute corresponding to the speed slider to obtain an audio signal corresponding to the second music control;

superimpose the audio signal corresponding to the first music control and the audio signal corresponding to the second music control to obtain the audio signal.

The terminal device provided in this embodiment can be used to perform the steps in any of the above method embodiments. Implementation principles and technical effects thereof are similar, and will not be repeated here.

Figure 12:
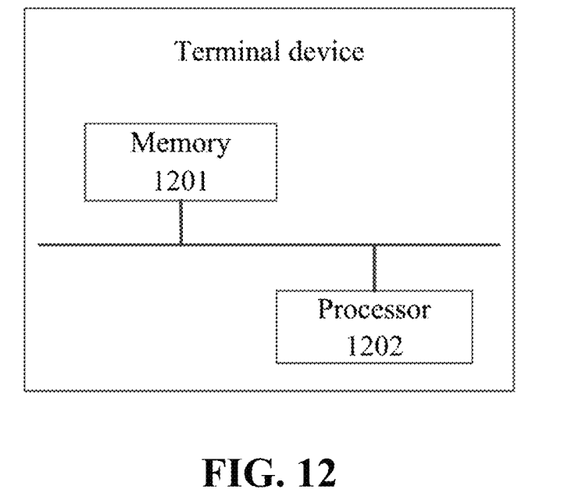
FIG. 12 is a schematic diagram of a hardware structure of a terminal device provided by the present application.

FIG. 12 is a schematic diagram of a hardware structure of a terminal device provided by the present application. As shown in FIG. 12, the terminal device in this embodiment includes:

a memory 1201, configured to store executable instructions;

a processor 1202, configured to implement the special effect processing method described in any of the above embodiments by executing the executable instructions, a specific implementing principle of which can be found in the above embodiments and will not be repeated here in this embodiment.

The present application provides a computer-readable storage medium having a computer program stored thereon. When the computer program is executed by a processor, the special effect processing method described in any of the above embodiments is implemented.

The present application further provides a program product which includes a computer program. The computer program is stored in a readable storage medium, and when the computer program is executed by a processor, the special effect processing method described in any of the above embodiments is implemented.

The present application further provides a computer program stored in a computer-readable storage medium. When the computer program is executed by a processor, the special effect processing method described in any of the above embodiments is implemented.

In several embodiments provided by the present application, it should be understood that the disclosed apparatuses and methods can be implemented in other ways. For example, the apparatus embodiments described above are only schematic. For example, the division of the units is only a logical function division, and in actual implementations, there may be other division methods. For example, multiple units or components may be combined or integrated into another system, or some features may be ignored or not implemented. On the other hand, the mutual coupling or direct coupling or communication connection as shown or discussed may be indirect coupling or communication connection through some interfaces, apparatuses or units, which may be electrical, mechanical or in other forms.

The units described as separate components may be or may not be physically separated, and the components displayed as units may be or may not be physical units, that is, they may be located in one place or distributed to multiple network units. Some or all of the units can be selected according to actual needs to realize the purpose of the solutions of the embodiments.

In addition, the functional units in the embodiments of the present application may be integrated in one processing unit; each unit may also exist physically alone, or two or more units may be integrated into one unit. The above integrated units may be realized in a form of hardware, or in a form of hardware plus software functional units.

The above integrated unit implemented in a form of software functional units may be stored in a computer-readable storage medium. The above software functional units are stored in a storage medium, including several instructions for causing a computer device (which may be a personal computer, a server, or a network device, etc.) or a processor to execute some steps of the method described in each embodiment of the present application. The aforementioned storage medium includes various media that can store program codes, such as an USB flash disk, a mobile hard disk, a read-only memory (Read-Only Memory, ROM), a random access memory (Random Access Memory, RAM), a magnetic disk or an optical disc, etc.

It should be understood that the processor described in the present application may be a central processing unit (Central Processing Unit, CPU), and may also be other general-purpose processor, a digital signal processor (Digital Signal Processor, DSP), an application specific integrated circuit (Application Specific Integrated Circuit, ASIC), etc. The general-purpose processor may be a microprocessor or may be any conventional processor, etc. The steps of the method disclosed in the present application may be directly embodied as being executed and completed by a hardware processor, or being executed and completed by a combination of hardware and software modules in the processor.

Finally, it should be noted that the above embodiments are only used to illustrate the technical solutions of the present application, rather than limiting them. Although the present application has been described in detail with reference to the aforementioned embodiments, those of ordinary skills in the art should understand that they can still modify the technical solutions recorded in the aforementioned embodiments, or equivalently replace some or all of technical features. And these modifications or replacements do not make the essence of the corresponding technical solutions deviate from the scope of the technical solutions of the various embodiments of the present application.

The invention claimed is:

1. A special effect processing method, comprising:
in a process of playing a video, in response to a touch operation of a user on a first music control and a second music control, generating an audio signal corresponding to the first music control and an audio signal corresponding to the second music control, and superimposing the audio signal corresponding to the first music control and the audio signal corresponding to the second music control to obtain an audio signal, wherein the first music control corresponds to a low-frequency timbre, and the second music control corresponds to a high-frequency timbre;
segmenting the obtained audio signal into multiple audio frames; and
performing, according to attributes of the audio frames, special effect processing on a picture which is currently played in the video.

2. The method according to claim 1, wherein the attributes comprise frequency spectrums; and performing, according to the attributes of the audio frames, the special effect processing on the picture which is currently played in the video comprises:
controlling, according to a first energy value corresponding to a first preset interval on a frequency spectrum, whether to add animation to an operation control corresponding to the touch operation, wherein the operation control corresponding to the touch operation comprises the first music control and the second music control.

3. The method according to claim 2, wherein controlling, according to the first energy value corresponding to the first preset interval on the frequency spectrum, whether to add the animation to the operation control corresponding to the touch operation comprises:
upon determining that the first energy value is greater than or equal to a preset energy value, adding the animation to the operation control corresponding to the touch operation.

4. The method according to claim 2, wherein the first preset interval comprises first M frequencies from the lowest frequency to the highest frequency on the frequency spectrum, and the first energy value is a sum of energy values corresponding to the preset number of first frequencies, wherein M is a preset number.

5. The method according to claim 1, wherein the attributes comprise frequency spectrums; and performing, according to the attributes of the audio frames, the special effect processing on the picture which is currently played in the video comprises:
controlling a full-screen floodlight effect by using a filter according to a second energy value corresponding to a second preset interval on a frequency spectrum.

6. The method according to claim 5, wherein controlling the full-screen floodlight effect by using the filter according to the second energy value corresponding to the second preset interval on the frequency spectrum comprises:
determining, according to the second energy value and a preset mapping relationship, brightness corresponding to the second energy value, wherein the preset mapping relationship is a preset corresponding relationship between energy values and brightness;
adjusting a brightness intensity parameter of the filter to the brightness corresponding to the second energy value.

7. The method according to claim 5, wherein the second preset interval comprises last N frequencies from the lowest frequency to the highest frequency on the frequency spectrum, and the second energy value is a sum of energy values corresponding to the preset number of last frequencies, wherein N is a preset number.

8. The method according to claim 1,
wherein generating the audio signal corresponding to the first music control and the audio signal corresponding to the second music control, and superimposing the audio signal corresponding to the first music control and the audio signal corresponding to the second music control to obtain the audio signal comprises:
performing looping rendering on notes corresponding to the first music control according to the timbre corresponding to the first music control to obtain the audio signal corresponding to the first music control;
performing looping rendering on notes corresponding to the second music control according to the timbre corresponding to the second music control to obtain the audio signal corresponding to the second music control;
superimposing the audio signal corresponding to the first music control and the audio signal corresponding to the second music control to obtain the audio signal.

9. The method according to claim 1, wherein an operation control corresponding to the touch operation comprises: the first music control, the second music control, and a third music control, wherein the third music control corresponds to a first audio signal;
wherein generating the audio signal corresponding to the first music control and the audio signal corresponding to the second music control, and superimposing the audio signal corresponding to the first music control and the audio signal corresponding to the second music control to obtain the audio signal comprises:
performing looping rendering on notes corresponding to the first music control according to the timbre corresponding to the first music control to obtain the audio signal corresponding to the first music control;
performing looping rendering on notes corresponding to the second music control according to the timbre corresponding to the second music control to obtain the audio signal corresponding to the second music control; and
superimposing the audio signal corresponding to the first music control, the audio signal corresponding to the second music control and the first audio signal to obtain the audio signal, wherein the first audio signal is an audio signal rendered in advance.

10. The method according to claim 1, wherein an operation control corresponding to the touch operation comprises: the first music control, the second music control, and a speed slider;

wherein generating the audio signal corresponding to the first music control and the audio signal corresponding to the second music control, and superimposing the audio signal corresponding to the first music control and the audio signal corresponding to the second music control to obtain the audio signal comprises:

performing looping rendering on notes corresponding to the first music control according to the timbre corresponding to the first music control and the number of beats per minute corresponding to the speed slider to obtain the audio signal corresponding to the first music control;

performing looping rendering on notes corresponding to the second music control according to the timbre corresponding to the second music control and the number of beats per minute corresponding to the speed slider to obtain the audio signal corresponding to the second music control; and superimposing the audio signal corresponding to the first music control and the audio signal corresponding to the second music control to obtain the audio signal.

11. A terminal device, comprising a memory and a processor, wherein the memory stores executable instructions; and wherein the processor executes the computer execution instruction stored in the memory, so that the processor is configured to:

in a process of playing a video, in response to a touch operation of a user on a first music control and a second music control, generate an audio signal corresponding to the first music control and an audio signal corresponding to the second music control, and superimpose the audio signal corresponding to the first music control and the audio signal corresponding to the second music control to obtain an audio signal, wherein the first music control corresponds to a low-frequency timbre, and the second music control corresponds to a high-frequency timbre;

segment the obtained audio signal into multiple audio frames; and perform, according to attributes of the audio frames, special effect processing on a picture which is currently played in the video.

12. The terminal device according to claim 11, wherein the attributes comprise frequency spectrums, and the processor is specifically configured to:

control, according to a first energy value corresponding to a first preset interval on a frequency spectrum, whether to add animation to an operation control corresponding to the touch operation, wherein upon determining that the first energy value is greater than or equal to a preset energy value, the animation is added to the operation control corresponding to the touch operation, wherein the operation control corresponding to the touch operation comprises: the first music control and the second music control.

13. The terminal device according to claim 12, wherein the first preset interval comprises first M frequencies from the lowest frequency to the highest frequency on the frequency spectrum, and the first energy value is a sum of energy values corresponding to the preset number of first frequencies, wherein M is a preset number.

14. The terminal device according to claim 11, wherein the attributes comprise frequency spectrums, and the processor is specifically configured to:

control a full-screen floodlight effect by using a filter according to a second energy value corresponding to a second preset interval on a frequency spectrum.

15. The terminal device according to claim 14, wherein the processor is specifically configured to:

determine, according to the second energy value and a preset mapping relationship, brightness corresponding to the second energy value, wherein the preset mapping relationship is a preset corresponding relationship between energy values and brightness;

adjust a brightness intensity parameter of the filter to the brightness corresponding to the second energy value.

16. The terminal device according to claim 14, wherein the second preset interval comprises last N frequencies from the lowest frequency to the highest frequency on the frequency spectrum, and the second energy value is a sum of energy values corresponding to the preset number of last frequencies, wherein N is a preset number.

17. The terminal device according to claim 11, wherein the processor is specifically configured to:

perform looping rendering on notes corresponding to the first music control according to the timbre corresponding to the first music control to obtain the audio signal corresponding to the first music control;

perform looping rendering on notes corresponding to the second music control according to the timbre corresponding to the second music control to obtain the audio signal corresponding to the second music control; and superimpose the audio signal corresponding to the first music control and the audio signal corresponding to the second music control to obtain the audio signal.

18. The terminal device according to claim 11, wherein an operation control corresponding to the touch operation comprises: the first music control, the second music control, and a third music control, wherein the third music control corresponds to a first audio signal, and the processor is specifically configured to:

perform looping rendering on notes corresponding to the first music control according to the timbre corresponding to the first music control to obtain the audio signal corresponding to the first music control;

perform looping rendering on notes corresponding to the second music control according to the timbre corresponding to the second music control to obtain the audio signal corresponding to the second music control; and superimpose the audio signal corresponding to the first music control, the audio signal corresponding to the second music control and the first audio signal to obtain the audio signal, wherein the first audio signal is an audio signal rendered in advance.

19. The terminal device according to claim 11, wherein an operation control corresponding to the touch operation comprises: the first music control, the second music control, and a speed slider, wherein the processor is specifically configured to:

perform looping rendering on notes corresponding to the first music control according to the timbre corresponding to the first music control and the number of beats per minute corresponding to the speed slider to obtain the audio signal corresponding to the first music control;

perform looping rendering on notes corresponding to the second music control according to the timbre corresponding to the second music control and the number of beats per minute corresponding to the speed slider to obtain the audio signal corresponding to the second music control; and superimpose the audio signal corresponding to the first music control and the audio signal corresponding to the second music control to obtain the audio signal.

20. A non-transitory computer-readable storage medium having a computer program stored thereon, wherein when the computer program is executed by a processer, the following operations are implemented:

in a process of playing a video, in response to a touch operation of a user on a first music control and a second music control, generating an audio signal corresponding to the first music control and an audio signal corresponding to the second music control, and superimposing the audio signal corresponding to the first music control and the audio signal corresponding to the second music control to obtain an audio signal, wherein the first music control corresponds to a low-frequency timbre, and the second music control corresponds to a high-frequency timbre;

segmenting the obtained audio signal into multiple audio frames; and performing, according to attributes of the audio frames, special effect processing on a picture which is currently played in the video.

* * * * *